Oct. 4, 1960

E. E. MOYER ET AL 2,955,247

MAGNETIC AMPLIFIER REGULATOR CIRCUIT

Filed July 24, 1958

INVENTORS
ELMO E. MOYER
RICHARD J. KLEIN
BY
Woodling and Krost,
attys 2,955,247
Patented Oct. 4, 1960

2,955,247

MAGNETIC AMPLIFIER REGULATOR CIRCUIT

Elmo E. Moyer, Cuba, and Richard J. Klein, Caneadea, N.Y., assignors to Acme Electric Corporation, Cuba, N.Y., a corporation of New York Filed July 24, 1958, Ser. No. 750,822

12 Claims. (Cl. 321—18)

The invention relates generally to magnetic amplifier circuits and more particularly to rectifier circuits for regulating a condition of an electrical load with the magnetic amplifier controlled by a transistor.

Transistors have previously been used to control magnetic amplifiers with the magnetic amplifiers in turn controlling current and/or voltage to a load. Such prior art circuits have had several shortcomings, one being that transistors have relatively low peak voltage ratings and accordingly the peak voltage of the alternating current input voltage with which the transistor was used was limited.

Accordingly, an object of the present invention is to provide a regulating circuit utilizing high voltages, yet controlled by transistors.

Another object of the invention is to provide a transistor-controlled magnetic amplifier in a regulating circuit which is simple and reliable in operation and yet has very good regulating characteristics.

Another object of the invention is to provide a transistor-controlled magnetic amplifier circuit for controlling direct current loads of many different types.

Another object of the invention is to provide a voltage regulating circuit utilizing magnetic amplifiers.

Still another object of the invention is to provide a direct current regulating circuit wherein the amount of load current through a transistor controls the amount of reset current through the magnetic amplifier, and the transistor load current is controlled by an electrical feedback from the output of the regulating circuit.

Another object of the invention is to provide a voltage regulating circuit for a direct current load having a counter-electromotive force which regulating circuit is extremely accurate in its control of the voltage throughout the desired range.

Another object of the invention is to provide a magnetic amplifier regulating circuit wherein a transistor is operative in a half-wave circuit, yet in turn controls a full-wave circuit arrangement for controlling two separate and similar magnetic amplifiers in the regulating circuit.

Other objects and a fuller understanding of the invention may be had by referring to the following description and claims, taken in conjunction with the accompanying drawings, in which:

Figure 1:
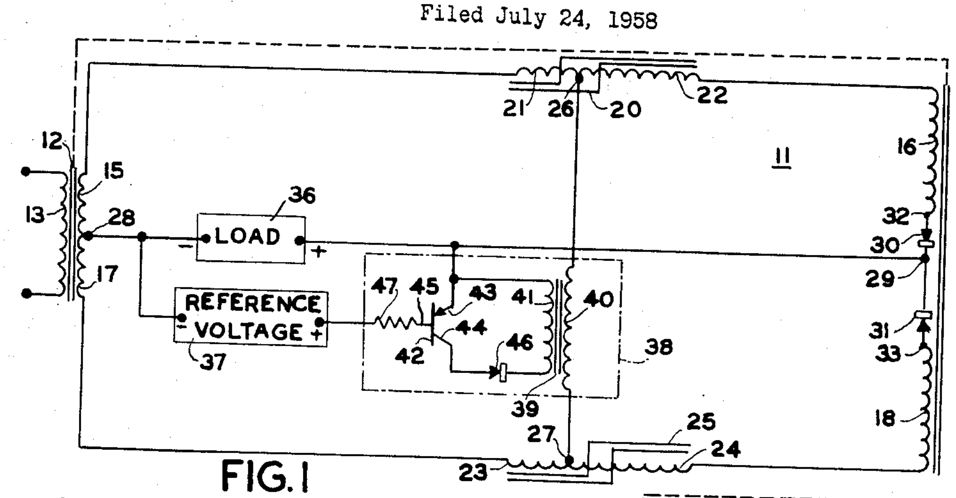
Figure 1 is a schematic diagram of a circuit embodying the invention.

Figure 1 shows a regulating circuit 11 having a transformer 12 with a primary 13 adapted to be energized from any suitable source of alternating current. The transformer 12 is an alternating voltage input means and has first, second, third and fourth secondaries 15 through 18, respectively, with all secondaries on a common core. A magnetic amplifier 20 has first and second windings 21 and 22 on a common saturable core. Third and fourth magnetic amplifier windings 23 and 24, respectively, are wound on another magnetic core and constitute magnetic amplifier 25. The windings 21 and 22 may be separate windings or, as shown in Figure 1, may be one continuous winding with a tap 26 thereon. The windings 23 and 24 are joined at a terminal 27 and the terminals 26 and 27 may be considered as control terminals.

A terminal 28 interconnects the first and third secondaries 15 and 17 and a terminal 29 interconnects first and second main rectifiers 30 and 31, respectively. A terminal 32 is at the junction of the second secondary 16 and rectifier 30, and a terminal 33 is at the junction of the fourth secondary 18 and rectifier 31. The first secondary 15 and first magnetic amplifier winding 21 are connected in series between terminals 28 and 26, and the second magnetic amplifier winding 22, the second secondary 16 and the rectifier 30 are connected in series between terminals 26 and 29. A load 36 may be connected between the terminals 28 and 29 and hence the secondaries 15 and 16 and magnetic amplifier windings 21 and 22, together with rectifier 30, make a half-wave rectifier circuit for the load 36. The load 36 may be a direct current load having a counter-electromotive force such as a storage battery, a motor or a largely capacitive load.

Another half-wave rectifier circuit is provided for load 36 to make a full-wave diametric circuit for this load. The full-wave circuit provides two alternative paths for rectified current to the load. This other half-wave circuit includes the serially connected third secondary 17, the magnetic amplifier windings 23 and 24, the fourth secondary 18, and the rectifier 31. A reference voltage standard 37 has its negative terminal connected to the negative terminal of the load; namely, terminal 28. A transistor circuit 38 includes a coupling transformer 39 having a primary 40 connected between terminals 26 and 27 and a secondary 41. A transistor 42 has emitter, collector, and base electrodes 43, 44 and 45, respectively, with the base electrode 45 connected through a resistor 47 to the positive terminal of the reference voltage 37. The emitter electrode 43 is connected to one end of the secondary 41 and is also connected to terminal 29 which is the positive terminal of the load 36. The collector electrode 41 is connected through a control diode 46 to the other end of the secondary 41.

*Operation*

In the full-wave diametric circuit for the load 36, which is the series loop around the entire outside of the elements of Figure 1, the voltages of the four secondaries are all instantaneously additive in polarity, as are the voltages across the four magnetic amplifier windings. The secondaries 15 and 17 have been described as two separate windings, but actually they could be a single winding with a center tap 28 and it is desired in either event that the two secondaries 15 and 17 have substantially equal magnitude of voltage. Also the ratio of magnitude of voltage of the first and second secondaries 15 and 16 should be equal or generally equal to the ratio of reactance of the first and second magnetic amplifier windings 21 and 22. Similarly, the ratio of magnitude of voltage of the third and fourth secondaries 17 and 18 should be generally equal to the ratio of reactance of the third and fourth magnetic windings 23 and 24.

The transistor circuit 38 has an input at the emitter and base electrodes 43 and 45, which input compares the voltage of the load 36 with the voltage of the reference standard 37. The voltage of the load 36 is a feedback voltage representative of a condition of the load 36 and may be obtained in any suitable manner, the Figure 1 showing this feedback voltage obtained in a very simple arrangement; namely, directly across the load. The transistor 42 has a load circuit which includes the emitter and collector electrodes 43 and 44 in a series loop circuit with the control diode 46 and secondary 41. The coupling transformer 39 may be a step-down transformer so that the primary 40 has considerably greater voltage than the secondary 41.

The alternating current input will have positive and negative half cycles of voltage and during the positive half-wave, that is, when the upper end of secondary 15 is positive, this will provide a positive potential to the anode of the rectifier 30 to cause it to conduct current to the load 36. During the negative half cycles, rectifier 31 will conduct to establish the full-wave diametric circuit. The regulating circuit 11 is in this case a voltage regulating circuit to maintain the voltage of the load 36 substantially constant and it has been found that this regulation may be within a few percent throughout the entire current range from zero load to full load. As the voltage of the load 36 tends to increase for any reason, this makes the emitter electrode 43 more positive relative to the base electrode 45. Consequently, an increased transistor input current is passed therebetween and hence a greater transistor load current from the emitter to the collector electrodes 43 and 44, respectively, is caused to flow. This transistor load current flows through the secondary 41 as caused by the voltage across this secondary 41. Accordingly, an increased current flows through the primary 40 in the loop circuit including secondaries 15 and 17 and magnetic amplifier windings 21 and 23. During the positive half cycles, current flows to the right in the magnetic amplifier windings 21 and 22 and current in the loop including the coupling transformer primary 40 also includes current which flows to the right in the magnetic amplifier winding 21. However, this current flows to the left in the magnetic amplifier winding 23 and hence acts as a reset current to reset the magnetic amplifier 25. With the rectangular hysteresis loop characteristic of the saturable core of the magnetic amplifier, the more the magnetic amplifier is reset, the greater will be its impedance.

Conversely, on the negative half cycles of the input voltage, when the magnetic amplifier 25 is conducting load current to the right, the reset current flowing through the loop including the coupling transformer primary 40 establishes this reset current to the left in the magnetic amplifier winding 21. Accordingly, this magnetic amplifier 20 is reset during the negative half cycles. The coupling transformer 39 is a circuit element or inductive winding in the load circut of the transistor 42 which causes a reset current to flow through the magnetic amplifiers 20 and 25, in accordance with the transistor load current and hence in accordance with the input voltage to the transistor. Thus, as the voltage of the load 36 tends to increase, the transistor input current increases, the transistor load current increases, and the reset current through the primary 40 increases to increase the impedance of both magnetic amplifiers 20 and 25, hence this lowers the load voltage.

Another way of considering the circuit operation is that the coupling transformer 39 is a variable impedance connected across the control terminals 26 and 27. The voltage applied to the input of the transistor 42 controls its impedance and hence controls the load current in the transformer secondary 41 and increases the secondary current. This causes an increased load on the secondaries 15 and 17 and magnetic amplifier windings 21 and 23. This increased load, as explained above, establishes a reset of each magnetic amplifier on alternate half-waves to decrease the load voltage. It will be noted that the transistor 42 operates in a half-wave circuit including the control diode 46. However, the transformer primary 40 operates in an alternating current circuit arrangement to alternatively reset each of the magnetic amplifiers 20 and 25 equally.

Figure 2:
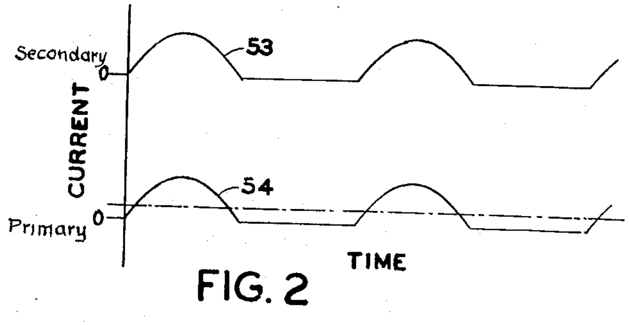
Figure 2 is a graph of voltages and currents obtained in the circuit of Figure 1.

The load 36 may be one having a counter-electromotive force. When the average voltage applied by rectifiers 30 and 31 exceeds the average counter-electromotive force of the load 36, then the emitter 43 will become positive relative to the base 45. It is during this period that the transistor 42 may conduct current, depending upon the amount of reset desired. Curve 53 of Figure 2 may represent the current, under certain conditions of operation, in the secondary 41 of the coupling transformer 39. This is essentially a half-wave current form, yet curve 54 illustrates that the current in the primary 40 seeks a symmetrical axis so that the area under the curve on each side of the axis is equal. This permits the half-wave circuit in the secondary 41 to control the full-wave power circuit connected to the primary 40 and alternately resets the magnetic amplifiers 20 and 25 by equal amounts. The ratio of voltages of the secondaries 15 and 16, and the corresponding ratio of the reactance of the magnetic amplifier windings 21 and 22 may be of any desired ratio, not necessarily an integer ratio. The smaller the voltage of secondary 15 relative to secondary 16, the smaller will be the peak voltage developed across the transformer primary 40. Also since the transformer 39 may be made a step-down transformer, the voltage across the secondary 41 may be made even smaller than that across the primary 40. Accordingly, the peak voltage, especially the peak voltages to which the transistor 42 is subjected may be established well within the peak voltage rating of transistors. Currently available transistors do not have a high peak voltage rating, eighty volts being a very high value and generally twenty to forty volts is a high operating voltage rating. The circuit of Figure 1 permits such low voltage transistors to control high voltage regulating circuits involving several hundred volts and hence the load 36 may be a large voltage and a large wattage load.

Figure 3:
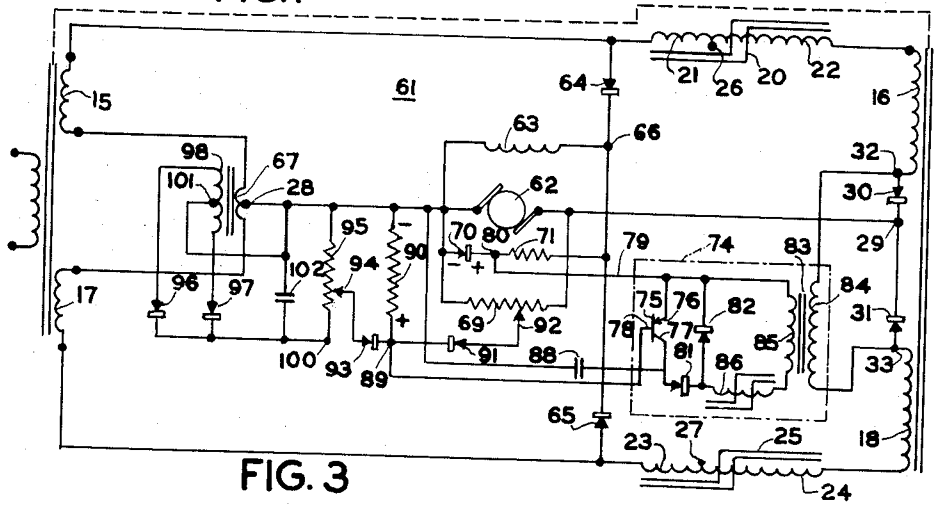
Figure 3 is a schematic diagram of a modification of the invention.

Figure 3 is a modified form of the invention wherein a regulating circuit 61 has many of the components of the regulating circuit 11 of Figure 1. Again, the four secondaries 15 through 18 and the four magnetic amplifier windings 21 through 24 are used. A load is connected across the output terminals 28 and 29. In this case the load is shown as being an armature 62 of a direct current motor, and includes a current transformer primary 67 with the terminal 28 at the center tap thereof. A field 63 of this motor is energized at a fixed value by a full-wave diametric circuit including rectifiers 64 and 65 interconnected at a terminal 66 and connected across the series combination of secondaries 15 and 17. The other end of the field 63 is connected to the negative terminal of the load; namely, terminal 28.

A feedback potentiometer 69 is connected across the load 62 and is representative of means for obtaining a feedback voltage dependent upon a load condition, in this case load voltage. A zener diode 70 and a resistor 71 are connected in series across the field winding 63 as a source of voltage, so that the zener diode 70 may develop substantially constant voltage thereacross. As such it acts as a reference voltage standard. A transistor circuit 74 includes a transistor 75 having emitter, collector and base electrodes 76, 77 and 78, respectively. The emitter electrode 76 is connected to a conductor 79 connected to a terminal 80 at the junction of the zener diode 70 and resistor 71. A control diode 82 is connected across the emitter and collector electrodes 76 and 77 through a blocking diode 81. A coupling transformer 83 has a primary 84 connected across terminals 32 and 33 and has a secondary 85 connected in series with a control magnetic amplifier 86 and the control diode 82.

The base electrode 78 of transistor 75 is connected to the positive terminal 89 of a summing resistor 90. The other end of this resistor is connected to the negative load terminal 28. A filter capacitor 88 is connected between terminal 28 and the transistor collector electrode 77. A first transfer diode 91 is connected between the terminal 89 and the movable tap 92 on the potentiometer 69. A second transfer diode 93 is connected between the terminal 89 and a movable tap 94 on a current signal potentiometer 95. First and second current signal rectifiers 96 and 97 have one terminal of each connected to opposite ends of a current transformer secondary 98 and the other terminals thereof connected to a positive terminal 100 of the current signal potentiometer 95. A center tap 101 of the current transformer secondary 98 is connected to the terminal 28 and a filter capacitor 102 is connected across terminals 28 and 100. These current signal rectifiers develop a voltage across the current signal potentiometer in accordance with the load current.

The circuit 61 of Figure 3 has an extra stage of gain to control larger loads, in this case illustrated by the direct current motor armature 62. The circuit 61 is again a voltage regulating circuit to maintain substantially constant the voltage of the load 62. The voltage feedback from potentiometer 69 is applied through the transfer diode 91 to the summing resistor 90 to make the terminal 89 positive with respect to the terminal 28. As such, the voltage developed across the summing resistor 90 is directly potential to the voltage of the load 62.

The current transformer primary 67 carries load current, and hence is a means, together with rectifiers 96 and 97, to develop a voltage across the potentiometer 95 which is dependent on another load condition, in this case load current. The filter capacitor 102 smooths this current signal voltage. The current signal voltage will be positive at terminal 100 relative to terminal 28.

Normally, the voltage regulating feature, as controlled by the feedback voltage potentiometer 69 will dominate the regulator circuit 61. However, the circuit 61 is designed so that if the load current exceeds a given value, for example, 120 percent of the rated load current, then the current signal from the potentiometer 95 will override the control normally effected by the voltage of the load. This overriding control is established by the position of the movable tap 94 and if the voltage selected at this movable tap exceeds the positive voltage on terminal 89, then the transfer diode 93 conducts current from the potentiometer 95 to the summing resistor 90 to make the terminal 89 even more positive in potential. In such case, the current signal controls the regulator circuit 61, as hereinafter described, to limit the load current. Therefore circuit 61 also incorporates a current regulator feature.

The summing resistor 90 is a means for comparing the local voltage with a current signal voltage dependent on load current, and to have a voltage thereacross is accordance with the one of greater magnitude.

The transistor 75 has an input circuit at the emitter and base electrodes 76 and 78. This plant circuit compares the voltage across the summing resistor 90 with the reference voltage of the zener diode 70. The filter capacitor 88 reduces the peak and inverse voltages on the transistor 75. As the voltage across the summing resistor 90 increases, the potential at the base electrode 78 becomes more positive relative to the emitter electrode 76 to cause a decreased transistor input current to flow. This causes a decreased transistor load current from the emitter to the collector electrodes 76 and 77, respectively. This transistor load current controls the reset current through the magnetic amplifier 86 which reset current is in the opposite direction relative to the load current through the magnetic amplifier 86 which passes from the secondary 85 through the diode 82 on positive half cycles. Since less reset current flows through the magnetic amplifier 86, its impedance decreases to increase the load current through the secondary 85 and this increases the current in the primary 84. This places an additional load on the four secondaries 15 through 18 and therefore increases the reset current for the magnetic amplifiers 20 and 25. Accordingly, the voltage of the load 62 is reduced.

Because of the extra stage of amplification in the control in Figure 3, the sense of polarity of the control on the input of the transistor of Figure 3 has been reversed relative to that shown in Figure 1. Both circuits Figure 1 and Figure 3 are voltage regulating circuits, however, to maintain substantially constant the voltage of the direct current load.

In Figure 3, the transistor circuit 74 establishes a variable impedance across terminals 32 and 33 to control the reset current in the magnetic amplifiers 20 and 25, and thus is similar to Figure 1 wherein the transistor circuit 38 establishes a variable impedance across the control terminals 26 and 27. In each case, this establishes a variable reset of the magnetic amplifiers 20 and 25.

In Figure 3 the circuit is such that the shunt field current of the motor also is metered by the current transformer 67. This is a satisfactory circuit operation since the shunt field current is usually a small value compared to the armature current. Also, the current limit circuit does not begin to function until full load value of armature current is reached, or thereabouts. The current transformer may be placed in the circuit to respond only to armature current by placing it in series with the main rectifiers 30 and 31 with a center tap at point 29. Alternatively, the current transformer primary could be split into two sections, one section in series with amplifier windings 21 and 22 and the other section in series with magnetic amplifier windings 23 and 24.

The voltage across terminals 28 and 66 which supplies the zener diode 70 will be a pulsating direct current having a zero value or minimum value twice each cycle. In such case the voltage across the zener diode will only be of a reference value during part of each half cycle. In many instances this will be adequate, especially if the smoothing action caused by the field winding 63 is sufficient. If not, the resistor 71 may be all or part of the resistance of a direct current choke to give additional filtering or smoothing action to the reference voltage across the zener diode 70.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A rectifier circuit for a direct current load adapted to be connected across two output terminals, comprising, in combination, alternating voltage input means, a rectifier device, a magnetic amplifier winding, means connecting said input means through said rectifier device and said magnetic amplifier winding to supply rectified current to said output terminals, an inductive winding connected to said magnetic amplifier winding to have impressed thereon an alternating voltage from said input means, feedback voltage means connected to said output to develop a feedback voltage dependent on a load condition, a reference voltage, a transistor having emitter, collector and base electrodes, a transistor input circuit comparing said feedback and reference voltages and connected to said emitter and base electrodes of said transistor, a transistor load circuit including said emitter and collector electrodes, and means connecting said inductive winding to be responsive to current flow in said transistor load circuit.

2. A full wave rectifier circuit for a direct current load adapted to be connected across two output terminals, comprising, in combination, alternating voltage input means, first and second rectifier devices, first and second magnetic amplifier windings on separate magnetic amplifiers, means providing first and second alternative rectifier paths from said input means to said output terminals through said first and second rectifier devices and said first and second magnetic amplifier windings, respectively, an inductive winding connected to said first and second magnetic amplifier windings to have impressed thereon an alternating voltage from said input means, feedback voltage means connected to said output to develop a feedback voltage dependent on a load condition, a reference voltage, a transistor having emitter, collector and base electrodes, a transistor input circuit comparing said feedback and reference voltages and connected to said emitter and base electrodes of said transistor, a transistor load circuit including said emitter and collector electrodes, and means connecting said inductive winding to be responsive to current flow in said transistor load circuit.

3. A full wave regulator circuit for a direct current load having a counter-electromotive force, comprising in combination, a transformer having a primary adapted to be connected to an alternating current source, first, second, third and fourth secondary windings on said transformer, first and second magnetic amplifier windings on separate magnetic amplifiers, first and second rectifier devices, first and second output terminals, means connecting said first and second secondaries and said first magnetic amplifier winding in series with said first rectifier device between said first and second output terminals, means connecting said third and fourth secondaries and said second magnetic amplifier winding in series with said second rectifier device between said first and second output terminals with said rectifier devices being in opposition, a transistor having emitter, collector and base electrodes, a reference voltage standard, a feedback voltage derived from the voltage across said load, means connecting said emitter and base electrodes of said transistor in series with said reference voltage standard and said feedback voltage with said feedback voltage and said reference voltage standard being in opposition, a coupling transformer having a primary and secondary, a transistor load circuit including said emitter and collector electrodes and said coupling transformer secondary, and means connecting said coupling transformer primary to said magnetic amplifiers to cause reset current flow through said coupling transformer and in at least part of said first and second magnetic amplifier windings corresponding to current in said transistor load circuit, whereby as the voltage of said direct current load changes in a given sense the potential of said emitter becomes more positive relative to said base electrode to pass more control current therebetween to consequently pass an increased transistor load current from said emitter to said collector electrode to thereby effect a change in the reset current through said at least a part of said first and second magnetic amplifier windings to change the impedance of said magnetic amplifiers to thereby change the voltage of said direct current load in the opposite sense.

4. A full wave diametric regulator circuit comprising, in combination, a transformer having a primary adapted to be connected to an alternating current source, first, second, third and fourth secondary windings on said transformer, first and second magnetic amplifier windings on a first saturable core, third and fourth magnetic amplifier windings on a second saturable core, a load circuit including a direct current load having a counter-electromotive force and first and second rectifier devices, means connecting in series circuit in the order named, said first secondary, said first and second magnetic amplifier windings, said second secondary, said first and second rectifier devices in opposed relationship, said fourth secondary, said fourth and third magnetic amplifier windings and said third secondary, said secondaries being connected in voltage additive relationship, the ratio of magnitude of voltage of said first and second secondaries being substantially equal to the ratio of magnitude of voltage of said third and fourth secondaries and to the ratio of reactance of said first and second magnetic amplifier windings and to the ratio of reactance of said third and fourth magnetic amplifier windings, the magnitude of voltage of said first and third secondaries being substantially equal, the voltage drops of said magnetic amplifier windings being additive, means connecting said direct current load between the junction of said rectifier devices and the junction of said first and third secondaries, a first control terminal connected at the junction of said first and second magnetic amplifier windings and a second control terminal connected at the junction of said third and fourth magnetic amplifier windings, a transistor having emitter, collector and base electrodes, a reference voltage standard, conductor means connecting said emitter and base electrodes of said transistor in series with said reference voltage standard and said direct current load with the voltage of said load and of said reference voltage standard in opposition, a coupling transformer having a primary and a secondary, a diode rectifier, conductor means connecting in series said coupling transformer secondary, said diode rectifier and said emitter and collector electrodes, and conductor means connecting said coupling transformer primary across said first and second control terminals, whereby as the voltage of said direct current load increases the potential of said emitter electrode becomes more positive relative to said base electrode to pass more control current therebetween to consequently pass an increased transistor load current from said émitter to said collector electrode and through said control transformer secondary to thereby pass an increased reset current through said control transformer primary and through said first and third magnetic amplifier windings to increase the impedance of all said magnetic amplifier windings to thereby decrease the voltage of said direct current load.

5. A full wave diametric regulator circuit comprising, in combination, a transformer having a primary adapted to be connected to an alternating current source, first, second, third and fourth secondary windings on said transformer, first and second magnetic amplifier windings on one magnetic amplifier, third and fourth magnetic amplifier windings on another magnetic amplifier, a load circuit for a direct current load having a counter-electromotive force, first and second rectifier devices, means connecting in series circuit in the order named, said first secondary, said first and second magnetic amplifier windings, said second secondary, said first and second rectifier devices in opposed relationship, said fourth secondary, said fourth and third magnetic amplifier windings and said third secondary, said secondaries being connected in voltage additive relationship, the ratio of magnitude of voltage of said first and second secondaries being substantially equal to the ratio of magnitude of voltage of said third and fourth secondaries and to the ratio of reactance of said first and second magnetic amplifier windings and to the ratio of reactance of said third and fourth magnetic amplifier windings, the magnitude of voltage of said first and third secondaries being substantially equal, the voltage drops of said magnetic amplifier windings being additive, means for connecting said direct current load between the junction of said rectifier devices and the junction of said first and third secondaries, first and second control terminals connected at the extremities of said serially connected rectifier devices, a transistor having emitter, collector and base electrodes, a feedback voltage derived in accordance with a condition of said load, a reference voltage standard, means connecting said emitter and base electrodes of said transistor in series with said reference voltage standard and said feedback voltage with said feedback voltage and said reference voltage standard in opposition, a coupling transformer having a primary and a secondary, a control magnetic amplifier, a diode rectifier, means connecting said coupling transformer secondary and said control magnetic amplifier in series with said diode rectifier, means connecting said diode rectifier across said emitter and collector electrodes, and conductor means connecting said coupling transformer primary across said first and second control terminals, whereby as one of the voltage and current of said direct current load increases the potential of said emitter becomes less positive relative to said base electrode to pass less control current therebetween to consequently pass decreased transistor load current from said emitter to said collector electrode and in a resetting direction through said control magnetic amplifier to thus pass an increased current through said control transformer secondary to thereby pass an increased reset current through said control transformer primary and through said magnetic amplifier windings to increase the impedance of both said magnetic amplifiers to thereby decrease the output to said direct current load.

6. A full wave regulator circuit for a direct current load having a counter-electromotive force, comprising, in combination, a transformer having a primary adapted to be connected to an alternating current source, first, second, third and fourth secondary windings on said transformer, first and second magnetic amplifier windings on separate magnetic amplifiers, first and second rectifier devices, first and second output terminals, means connecting said first and second secondaries and said first magnetic amplifier winding in series with said first rectifier device between said first and second output terminals, means connecting said third and fourth secondaries and said second magnetic amplifier winding in series with said second rectifier device between said first and second output terminals with said rectifier devices being in opposition, a transistor having emitter, collector and base electrodes, a reference voltage standard, a feedback resistor connected across said output terminals to develop a feedback voltage, means connecting said emitter and base electrodes of said transistor in series with said reference voltage standard and said feedback voltage with said feedback and reference voltages in opposition, a coupling transformer having a primary and a secondary, a control magnetic amplifier, a transistor load circuit including said control magnetic amplifier and said coupling transformer secondary connected in series with said emitter and collector electrodes, a diode rectifier connected across said emitter and collector electrodes, and means connecting said coupling transformer primary to said first and second magnetic amplifier windings to cause reset current flow through said coupling transformer and through said first and second magnetic amplifier windings corresponding to current in said transistor load circuit, whereby as the voltage of said direct current load changes in a given sense the potential of said emitter becomes more positive relative to said base electrode to pass more control current therebetween to consequently pass an increased transistor load current from said emitter to said collector electrode to thereby effect a change in the reset current through said first and second magnetic amplifier windings to change the impedance of said magnetic amplifiers to thereby change the voltage of said direct current load in the opposite sense.

7. A full wave regulator circuit for a direct current load having a counter electromotive force, comprising in combination, a transformer having a primary adapted to be connected to an alternating current source, first, second, third and fourth secondary windings on said transformer, first and second magnetic amplifier windings on separate magnetic amplifiers, first and second rectifier devices, first and second output terminals, means connecting said first and second secondaries and said first magnetic amplifier winding in series with said first rectifier device between said first and second output terminals, means connecting said third and fourth secondaries and said second magnetic amplifier winding in series with said second rectifier device between said first and second output terminals, a current transformer having center-tapped primary and secondary windings, said current transformer primary being connected in said load circuit with said center tap of said primary being said first output terminal, a current signal resistor, first and second current signal rectifiers connected in a full wave diametric circuit with said current transformer secondary and said current signal resistor to develop a current feedback signal, a transistor having emitter, collector and base electrodes, a reference voltage source, a transistor input circuit including means connecting said emitter and base electrodes of said transistor in series with said reference voltage source and said current feedback voltages with said feedback and reference voltages in opposition, a coupling transformer having a primary and a secondary, a control magnetic amplifier, a transistor load circuit including said control magnetic amplifier and said coupling transformer secondary connected in series with said emitter and collector electrodes, a diode rectifier connected across said emitter and collector electrodes, and means connecting said coupling transformer primary to said first and second magnetic amplifier windings to cause reset current flow through said first and second magnetic amplifier windings corresponding to current in said transistor load circuit, whereby as the current through said direct current load changes in a given sense the potential of said emitter becomes more positive relative to said base electrode to pass more control current therebetween to consequently pass an increased transistor load current from said emitter to said collector electrode to thereby effect a change in the reset current through said first and second magnetic amplifier windings to change the impedance of said separate magnetic amplifiers to thereby change the current through said direct current load in the opposite sense.

8. A full wave rectifier circuit for a direct current load adapted to be connected across two output terminals, comprising in combination, alternating voltage input means, first and second rectifier devices, first and second magnetic amplifier windings on separate magnetic amplifiers, means providing first and second alternative rectifier paths from said input means to said output terminals through said first and second rectifier devices and said first and second magnetic amplifier windings, respectively, an inductive winding connected to said first and second magnetic amplifier windings to have impressed thereon an alternating voltage from said input means, a current transformer having primary and secondary windings with said primary connected in series with said two output terminals, a current signal resistor, current signal rectifier means connected with said current transformer secondary and said current signal resistor to develop a current feedback signal thereacross, means connected across said output terminals to develop a feedback voltage, a transistor having emitter, collector and base electrodes, a reference voltage, a transistor input circuit comparing said feedback voltage and said current feedback signal and utilizing the larger to oppose said reference voltage in series with said emitter and base electrodes of said transistor, emitter and collector electrodes, and means connecting said inductive winding to be responsive to current flow in said transistor load circuit.

9. A full wave rectifier circuit for a direct current load adapted to be connected across two output terminals, comprising in combination, transformer adapted to be connected to an alternating voltage source, first and second secondary windings on said transformer, first and second rectifier devices, first and second magnetic amplifier windings on separate magnetic amplifiers, means connecting said first secondary and said first magnetic amplifier winding in series with said first rectifier device and said two output terminals, means connecting said second secondary and said second magnetic amplifier winding in series with said second rectifier device and said two output terminals, an inductive winding connected to said first and second magnetic amplifier windings to have impressed thereon an alternating voltage from said input alternating voltage source, a current transformer having primary and secondary windings with said primary connected in series with said two output terminals, a current signal resistor, current signal rectifier means connected with said current transformer secondary and said current signal resistor to develop a current feedback signal thereacross, means connected across said output terminals to develop a feedback voltage, a summing resistor, means connecting said feedback voltage and said summing resistor in series, means connecting said current feedback signal in series with said summing resistor to develop a voltage thereacross in the same sense as the voltage developed by said feedback voltage, a transistor having emitter, collector and base electrodes, a reference voltage, means connecting said emitter and base electrodes of said transistor in series with said reference voltage and said summing resistor, a transistor load circuit including said emitter and collector electrodes, and means connecting said inductive winding to be responsive to current flow in said transistor load circuit.

10. A rectifier circuit for a direct current load, comprising in combination, alternating voltage input means, a magnetic amplifier winding, a rectifier device, first and second output terminals for said load, a current transformer having primary and secondary windings, means connecting said alternating voltage input means and said magnetic amplifier winding in series with said rectifier device and said current transformer primary between said first and second output terminals, a current signal resistor, current signal rectifier means connected with said current transformer secondary and said current signal resistor to develop a current feedback signal thereacross, a transistor having emitter, collector and base electrodes, a reference voltage, means connected across said output terminals to develop a feedback voltage, a transistor input circuit comparing said feedback voltage and said current feedback signal and utilizing the larger to oppose said reference voltage in series with said emitter and base electrodes of said transistor, a coupling transformer having a primary and a secondary, transistor load circuit including said coupling transformer secondary connected in series with said emitter and collector electrodes, and means connecting said coupling transformer primary to said magnetic amplifier winding to cause reset current flow through said coupling transformer and through said magnetic amplifier winding corresponding to current in said transistor load circuit, whereby said direct current load is controlled by the one of current and voltage feedback signals of greater magnitude.

11. A full wave regulator circuit for a direct current load adapted to be connected across two output terminals, comprising in combination, a transformer adapted to be connected to an alternating current source, first, second, third and fourth secondary windings on said transformer, first and second magnetic amplifier windings on separate magnetic amplifiers, first and second rectifier devices, means connecting said first and second secondaries and said first magnetic amplifier winding in series with said first rectifier device between said two output terminals, means connecting said third and fourth secondaries and said second magnetic amplifier winding in series with said second rectifier device between said two output terminals, a current transformer having primary and secondary windings, said current transformer primary being connected in said load circuit, a current signal resistor, current signal rectifier means connected with said current transformer secondary and said current signal resistor to develop a current feedback signal thereacross, means connected across said output terminals to develop a feedback voltage, a summing resistor, means connecting said feedback voltage and said summing resistor in series, means connecting said current feedback signal in series with said summing resistor to develop a voltage thereacross in the same sense as the voltage developed by said feedback voltage, a transistor having emitter, collector and base electrodes, a reference voltage standard, means connecting said emitter and base electrodes of said transistor in series with said reference voltage standard and said summing resistor, a coupling transformer having a primary and a secondary, a transistor load circuit including said coupling transformer secondary connected in series with said emitter and collector electrodes, a diode rectifier connected across said emitter and collector electrodes, and means connecting said coupling transformer primary to said first and second magnetic amplifier windings to cause reset current flow through said coupling transformer and through said first and second magnetic amplifier windings corresponding to current in said transistor load circuit, whereby said direct current load is controlled by the one of current and voltage feedback signals of greater magnitude.

12. A full wave regulator circuit for a direct current load having a counter electromotive force, comprising in combination, a transformer having a primary adapted to be connected to an alternating current source, first, second, third and fourth secondary windings on said transformer, first and second magnetic amplifier windings on separate magnetic amplifiers, first and second rectifier devices, first and second output terminals, means connecting said first and second secondaries and said first magnetic amplifier winding in series with said first rectifier device between said first and second output terminals, means connecting said third and fourth secondaries and said second magnetic amplifier winding in series with said second rectifier device between said first and second output terminals, a current transformer having center-tapped primary and secondary windings, said current transformer primary being connected in said load circuit with said center tap of said primary being said first output terminal, a current signal resistor, first and second current signal rectifiers connected in a full wave diametric circuit with said current transformer secondary and said current signal resistor to develop a current feedback signal, a feedback resistor connected across said output terminals to develop a feedback voltage, a summing resistor, first transfer diode means connecting said feedback voltage and said summing resistor in series, second transfer diode means connecting said current feedback signal in series with summing resistor to develop a voltage thereacross in the same sense as the voltage developed by said first transfer diode means, a transistor having emitter, collector and base electrodes, a reference voltage standard, means connecting said emitter and base electrodes of said transistor in series with said reference voltage standard and said summing resistor, a coupling transformer having a primary and a secondary, a control magnetic amplifier, a transistor load circuit including said control magnetic amplifier and said coupling transformer secondary connected in series with said emitter and collector electrodes, a diode rectifier connected across said emitter and collector electrodes, and means connecting said coupling transformer primary to said first and second magnetic amplifier windings to cause reset current flow through said coupling transformer and through said first and second magnetic amplifier windings corresponding to current in said transistor load circuit, whereby as the voltage of said direct current load changes in a given sense the potential of said emitter becomes more positive relative to said base electrode to pass more control current therebetween to consequently pass an increased transistor load current from said emitter to said collector electrode to thereby effect a change in the reset current through said first and second magnetic amplifier windings to change the impedance of said magnetic amplifiers to thereby change the voltage of said direct current load in the opposite sense, and whereby as the current through said direct current load exceeds a given maximum the current feedback signal across said summing resistor exceeds the voltage feedback signal thereacross to override the control of said transistor normally effected by said voltage feedback to cause reset current to flow and hence to limit the output current to said load.

References Cited in the file of this patent

UNITED STATES PATENTS

| | | |
|---|---|---|
| 2,810,877 | Silver | Oct. 22, 1957 |
| 2,843,818 | Mintz et al. | July 15, 1958 |